United States Patent [19]
Rose

[11] 4,093,901
[45] June 6, 1978

[54] DC MOTOR SPEED CONTROL CIRCUIT
[76] Inventor: Ronald N. Rose, 2701 Terrace View La., Wayzata, Minn. 55391
[21] Appl. No.: 800,530
[22] Filed: May 25, 1977
[51] Int. Cl.² .............................................. H01H 7/08
[52] U.S. Cl. ...................................... 318/476; 361/30
[58] Field of Search ...................... 318/476, 332, 341; 361/23, 30, 33

[56] References Cited
U.S. PATENT DOCUMENTS

| | | | |
|---|---|---|---|
| 3,383,561 | 5/1968 | Thiele | 361/30 |
| 3,778,694 | 12/1973 | Hubby et al. | 318/476 |
| 3,914,675 | 10/1975 | Konrad | 361/30 |
| 3,931,557 | 1/1976 | Osburn | 318/476 |

Primary Examiner—David Smith, Jr.
Attorney, Agent, or Firm—Neil B. Schulte

[57] ABSTRACT

A DC motor speed control circuit in which the current to the motor is delivered in a series of pulses the width of which is variable in accordance with the setting on a throttle control potentiometer. The pulses are shaped to provide a fast turn on and slow turn off of the control transistor to avoid heat build up and lessen the inductive kickback of the motor. A novel feedback circuit senses excessive current draw and automatically shuts down the circuit and remains latched in that condition until the throttle control potentiometer is reduced to zero whereupon the circuit automatically resets itself. High efficiency is achieved by directing both the power current and the control current through the motor windings thus increasing the battery life.

9 Claims, 1 Drawing Figure

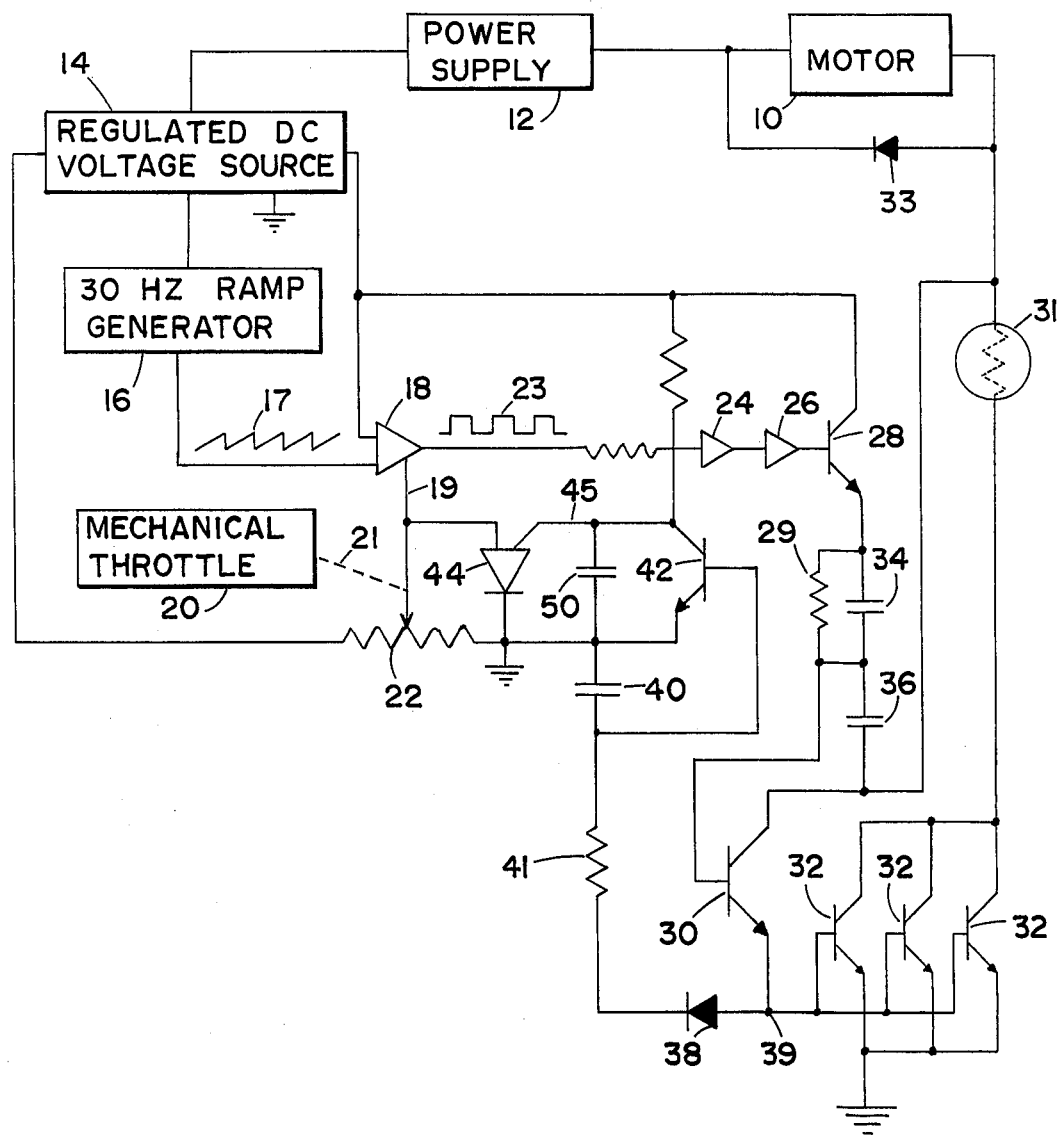

DC MOTOR SPEED CONTROL CIRCUIT

BACKGROUND OF THE INVENTION

My invention comprises a circuit particularly useful for controlling the speed of DC motors and other DC powered devices in all applications. The circuit is described herein with respect to its use on a trolling motor for fishing boats although it should be understood that the utility of the invention is not limited to this narrow application.

Prior art DC trolling motors have suffered from a number of disadvantages which are obviated by the circuit of my invention. In the past if the motor was forcibly stopped by weeds or the like a hazard was created in that as soon as the weeds were cleared as, for example, by hand, the motor would start again very quickly often injuring the person who was clearing the obstruction. My circuit avoids this problem by automatically shutting down the current to the motor and keeping the current off until the throttle is manually cycled to zero and back up again. Accordingly, if the operator forgets to move the throttle to zero there is still no hazard created when the obstruction is cleared and the motor freed.

Another problem common to prior art trolling motors involves inefficiency in the circuit in which much of the battery power that should be conserved for running the motor is lost as heat in the control circuits. The present invention minimizes this aspect too as described below.

SUMMARY OF THE INVENTION

Briefly, the present inventive circuit monitors the output power delivered to the motor. If this power exceeds a certain predetermined level, which it would in the case of the motor being forcibly stopped by an obstruction, the circuit is automatically shut down by shorting out the control signal through a programmable unijunction transistor. This transistor will continue to conduct and hold the circuit off until the throttle is returned to zero to eliminate the current flow through the transistor. Only then can the motor be restarted by once again cycling the throttle upwards. In addition, the circuit increases efficiency by minimizing the use of current for the control circuits and maximizing the amount of current delivered to the motor. This is done in several ways. Firstly, the control pulses are shaped to turn on very fast so as to drive the control transistors hard on and minimize the time that the transistors linger in the amplifying region where much heat is developed. The pulses are also shaped to turn off slowly thus easing the turn off of the motor to lessen the inductive kickback. This increases the life of the components and permits the use of less expensive protective diodes and less heat sinks. Another feature involves the design of the circuit to draw not only the drive power but also the control power through the motor so that virtually all of the current is being used to generate torque in the motor rather than wasted as heat energy in the control circuits. Several other efficiency and safety features are incorporated in the circuit also.

It may therefore be seen that it is an object of my invention to provide an improved speed control circuit for DC motors and other DC powered devices which is safer and more efficient than prior art devices and at the same time permits the use of smaller and less expensive components. Further objects and advantages will become apparent from the following description and drawing.

BRIEF DESCRIPTION OF THE DRAWING

The drawing shows a schematic diagram of the speed control circuit of my invention as it could be used with a trolling motor.

DESCRIPTION OF THE PREFERRED EMBODIMENT

Referring to the drawing it may be seen that a motor 10 is powered from a power supply 12 which also supplies power to a regulated DC voltage source 14. In the case of a trolling motor power supply 12 usually comprises a battery carried along in the boat which must be periodically recharged ashore. Thus, it is desirable to minimize any unnecessary drain from power supply 12. Source 14 operates at a reduced level relative to the battery voltage such as 5.1 volts so as to maintain stable operation even for reduced battery voltages.

A 30 hertz ramp generator 16 operating from voltage source 14 supplies a sawtooth or ramp shaped timing signal 17 to a timer or pulse shaper 18 which may comprise, for example, an LM555 integrated circuit. The low 30 Hz pulse rate allows the coils of the motor more time to charge which increases low speed torque. Waveform 17 causes timer 18 to turn on every time the voltage drops to zero in the ramp shaped signal. Timer 18 turns off again when the voltage in waveform 17 rises to the level established on line 19 by a variable potentiometer 22. Potentiometer 22 is in turn adjusted via a suitable mechanical connection 21 from a mechanical throttle 20 in a manner well known to those skilled in the art. The output of timer 18 comprises a square wave 23 at a frequency of 30 Hz in which the pulse width or duty cycle varies from 0-100% in accordance with the setting on throttle 20. Signal 23 is directed through a pair of impedance matching inverting amplifiers 24 and 26 to operate an emitter follower 28. The signal from transistor 28 is then presented through a resistor 29 to a control transistor 30 which in turn operates a plurality of output drive transistors 32. The speed of motor 10 will vary depending upon the length of the pulses of current delivered to it by drive transistors 32 which of course is in turn controlled by the pulse width or duty cycle of the signal from timer 18.

To avoid any delay in turning on control transistor 30 on each pulse from emitter follower 28, a pulse sharpening capacitor 34 is employed to pass the voltage change around resistor 29 directly to control transistor 30. This insures that transistor 30 goes hard on immediately and does not spend any appreciable time in its amplifying region where resistance wastes energy on the production of heat. In this manner the efficiency of the circuit is greatly improved. However, during the turn off portion of the control signal a capacitor 36 is used to slow down the turn off time so that power is not abruptly cut off from motor 10. In this way the inductive kickback from motor 10 is lessened by an order of magnitude permitting a less expensive counter E.M.F. clamping diode 33 to be utilized. Since the control signal frequency is low, only 30 hertz, the number of overall counter E.M.F. pulses is reduced as well. These protective features increase the lifetime of the electronic components in the circuit and lessen the heat sink requirements, thus, reducing maintenance costs and the initial expense of the control circuit.

Additional efficiency is achieved by the placement of control transistor 30 in the circuit as shown so that the control current through transistor 30 is drawn through motor 10 rather than directly from power supply 12. This insures that when the control circuit is operating its current is added to that of the output transistors 32 to drive the motor thereby converting as much of the battery's power as possible into driving force in the motor. Also a small resistance 31, which may be just the long lead wire to the motor, is placed in series with the collectors of output transistors 32. The voltage drop across resistance 31 increases as the output current increases thus assuring high base voltages on output transistors 32 from control transistor 30 when needed. The current flow through the output transistors is maximized and the voltage drop across the output transistors is minimized. Less heat is created, less heat sink is required, and more voltage is available to drive the motor 10.

If motor 10 is obstructed and caused to slow down or stop it will draw ever increasing current which shows up as an increase in voltage at point 39 in the circuit. If the voltage exceeds a predetermined level, diode 38 is forward biased and conducts through a resistor 41 to charge a capacitor 40. If the obstruction remains and the condition persists long enough, capacitor 40 charges to the point where transistor 42 is turned on thus lowering the voltage on line 45 and turning on a programmable unijunction transistor 44. Conduction through transistor 44 reduces the voltage on line 19 to ground, thus, causing timer 18 to turn off, immediately reducing the width of the pulses to zero. In this way the entire control circuit is shut down removing any driving current from the motor 10. In prior art circuits, once motor 10 was cleared of an obstruction the motor would very quickly start up again possibly injuring the person who was clearing the motor. With the present invention programmable unijunction transistor 44 continues to conduct, once activated, thus latching the control circuit in an off condition. The only way to restart the circuit is to move the mechanical throttle to an off position, reducing potentiometer 22 to the point where the current through transistor 44 is interrupted. Transistor 44 then turns off allowing the circuit to be reactivated when the throttle is once again advanced. Therefore, the only way to restart the motor is to clear the obstruction and then return to the throttle, move it to a closed position, and reopen the throttle insuring complete safety in the operation of the motor. A capacitor 50 guarantees that the anode voltage of transistor 44 always rises faster than the gate voltage when power is connected to the circuit. Consequently, if the throttle is left advanced, the circuit will latch to a shutdown condition when the battery is connected after recharging. Again, one must intentionally move the throttle to zero and advance it again to make the motor run.

It may be seen that my new and novel circuit permits a speed control which is adjustable from zero to 100% while maintaining a much higher efficiency of operation, lower initial and maintenance costs, and a high degree of safety. Since minor variations in the circuit may be made without departing from the spirit and scope of the invention by changing such items as the pulse width modulation scheme, the output drivers, or the control signal amplifying networks, I intend to be limited only by the following claims.

I claim:

1. A DC power control circuit adapted to control power to a load such as a motor comprising in combination:
   output means adapted to be connected to the load;
   output switching means connected to said output means;
   control switching means connected to said output switching means so as to control the output switching means;
   pulse generating means;
   manual control means;
   pulse width modulating means connected to said pulse generating means and to said manual control means so as to vary the duty cycle of the pulses from the pulse generating means in accordance with the position of the manual control means;
   control signal transfer means connected between said pulse width modulating means and said control switching means; and
   latching automatic shutdown means connected to said control switching means and to said pulse width modulating means so as to reduce the duty cycle of the pulses to zero in response to excessive current in the control switching means, said automatic means connected to latch on and hold the duty cycle of the pulses at zero until said manual control means is set at zero.

2. The circuit of claim 1 in which said control switching means is connected in series with the output means so as to draw control current through the load.

3. The circuit of claim 1 in which said transfer means includes a first capacitor in series connected to said control switching means to effect a fast turn on of said control switching means.

4. The circuit of claim 3 including a second capacitor connected across said control switching means to effect a slow turn off of said control switching means so as to minimize inductive kickback.

5. The circuit of claim 1 in which said latching automatic shutdown means comprises a voltage monitor circuit connected to said control switching means and to a programmable unijunction transistor, which transistor is connected to ground out a control voltage from the manual control means which control voltage normally controls said pulse width modulating means.

6. The circuit of claim 5 in which said control switching means is connected in series with the output means so as to draw control current through the load.

7. The circuit of claim 6 in which said transfer means includes a first capacitor in series connected to said control switching means to effect a fast turn on of said control switching means.

8. The circuit of claim 7 including a second capacitor connected across said control switching means to effect a slow turn off of said control switching means so as to minimize inductive kickback.

9. The circuit of claim 5 including a capacitor between the gate of said programmable unijunction transistor and ground so as to insure that the anode voltage rises faster than the gate voltage when power is applied to the circuit.

* * * * *